United States Patent
Tanoue et al.

(10) Patent No.: US 12,420,625 B2
(45) Date of Patent: Sep. 23, 2025

(54) SERIES HYBRID VEHICLE CONTROL METHOD AND SERIES HYBRID VEHICLE

(71) Applicant: Nissan Motor Co., Ltd., Yokohama (JP)

(72) Inventors: Shingo Tanoue, Kanagawa (JP); Kenji Yasaka, Kanagawa (JP); Kenichiro Shin, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/854,454

(22) PCT Filed: Apr. 6, 2022

(86) PCT No.: PCT/JP2022/017210
§ 371 (c)(1),
(2) Date: Oct. 4, 2024

(87) PCT Pub. No.: WO2023/195110
PCT Pub. Date: Oct. 12, 2023

(65) Prior Publication Data
US 2025/0108683 A1    Apr. 3, 2025

(51) Int. Cl.
  *B60K 6/46*    (2007.10)
  *B60W 10/08*   (2006.01)
  *B60W 20/50*   (2016.01)

(52) U.S. Cl.
  CPC ............ *B60K 6/46* (2013.01); *B60W 10/08* (2013.01); *B60W 20/50* (2013.01)

(58) Field of Classification Search
  None
  See application file for complete search history.

(56) References Cited

U.S. PATENT DOCUMENTS

| | | | |
|---|---|---|---|
| 8,688,300 B2 | 4/2014 | Takahashi et al. | |
| 9,879,620 B2* | 1/2018 | Makkapati | F02B 39/04 |
| 2012/0191280 A1* | 7/2012 | Ohno | B60K 6/46 |
| | | | 180/65.265 |
| 2013/0173098 A1* | 7/2013 | Takagi | B60W 10/06 |
| | | | 701/22 |
| 2014/0288742 A1* | 9/2014 | Hokoi | B60W 20/14 |
| | | | 180/65.265 |

(Continued)

FOREIGN PATENT DOCUMENTS

| | | |
|---|---|---|
| JP | 2006-187046 A | 7/2006 |
| JP | 2010-105626 A | 5/2010 |

(Continued)

*Primary Examiner* — Fadey S. Jabr
*Assistant Examiner* — Mario C Gonzalez
(74) *Attorney, Agent, or Firm* — Young Basile Hanlon & MacFarlane, P.C.

(57) ABSTRACT

A series hybrid vehicle control method controls a series hybrid vehicle including a power generation system that generates electric power by driving an electric generator with an internal combustion engine. A control unit is configured to, in a case where a failure occurs in the power generation system, limit a torque of the internal combustion engine, set an engine rotation speed at which power generation efficiency of the electric generator is maximized within a range in which the torque is limited, and control the internal combustion engine based on the engine rotation speed.

5 Claims, 5 Drawing Sheets

(56) References Cited

U.S. PATENT DOCUMENTS

2015/0217652 A1\* 8/2015 Chupin ................. B60L 53/56
                                                      320/137
2019/0353109 A1\* 11/2019 Hamamoto ........... F02D 11/107

FOREIGN PATENT DOCUMENTS

| JP | 2011247113 | A | \* | 12/2011 |
| JP | 5086973 | B2 | | 11/2012 |
| JP | 2017115670 | A | \* | 6/2017 |
| JP | 2020-183716 | A | | 11/2020 |

\* cited by examiner

SERIES HYBRID VEHICLE CONTROL METHOD AND SERIES HYBRID VEHICLE

TECHNICAL FIELD

The present invention relates to a series hybrid vehicle control method and a series hybrid vehicle.

BACKGROUND ART

JP5086973B2 discloses control for so-called limp-home travelling in a case where an abnormality related to an internal combustion engine occurs in a hybrid vehicle. Specifically, JP5086973B2 discloses that in a case where an abnormality occurs during operation of the internal combustion engine, travelling is realized by a second electric motor in a state in which the internal combustion engine is caused to execute motoring by a first electric motor. The reason why a state of the internal combustion engine is switched from an operating state to a motoring state is that by suppressing a rapid rotation speed fluctuation of the internal combustion engine in a high vehicle speed state, a secondary failure associated with the rotation speed fluctuation is avoided.

SUMMARY OF INVENTION

However, in a series hybrid vehicle, when the internal combustion engine is switched to the motoring state as in the control for limp-home travelling described in the above document, the power generation that is based on the internal combustion engine is not executed, and a travelable distance depends on a state of charge of a battery. Accordingly, depending on the state of charge of the battery or a distance to a destination of the limp-home travelling, the vehicle may reach a power shortage state during travelling.

Accordingly, an object of the present invention is to provide a series hybrid vehicle control method and a series hybrid vehicle that can avoid reaching a power shortage state during limp-home travelling.

According to an aspect of the present invention, there is provided a hybrid vehicle control method for controlling a series hybrid vehicle including a power generation system that generates electric power by driving an electric generator with an internal combustion engine. In the control method, in a case where a failure occurs in the power generation system, a control unit limits a torque of the internal combustion engine, sets an engine rotation speed at which power generation efficiency of the electric generator is maximized within a range in which the torque is limited, and controls the internal combustion engine based on the engine rotation speed.

According to another aspect of the present invention, there is provided a series hybrid vehicle including a power generation system that generates electric power by driving an electric generator with an internal combustion engine, and a control unit that controls the power generation system. In the vehicle, the control unit is programmed to, in a case where a failure occurs in the power generation system, limit a torque of the internal combustion engine, set an engine rotation speed at which power generation efficiency of the electric generator is maximized within a range in which the torque is limited, and control the internal combustion engine based on the engine rotation speed.

DESCRIPTION OF EMBODIMENTS

Hereinafter, embodiments of the present invention will be described with reference to the drawings.

[Configuration Example of Vehicle]

Figure 1:
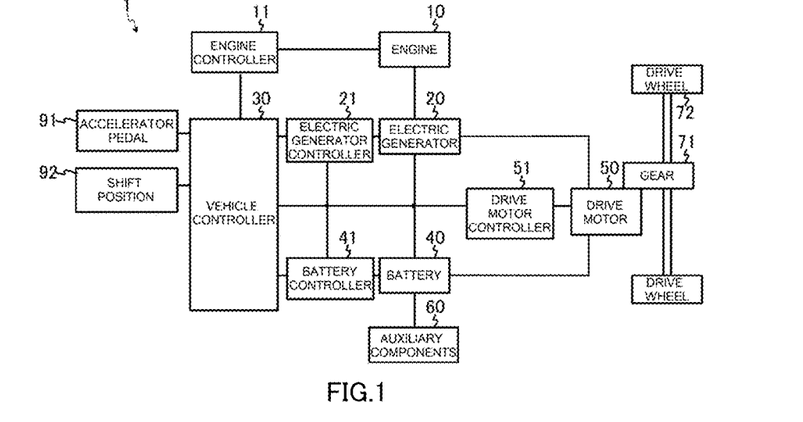
FIG. 1 is a schematic configuration diagram of a vehicle according to an embodiment of the present invention.

FIG. 1 is a schematic configuration diagram of a vehicle 1. The vehicle 1 is a series hybrid vehicle, and in the present embodiment, an electric power generation control system for the series hybrid vehicle will be mainly described.

The vehicle 1 includes an internal combustion engine (hereinafter, also simply referred to as an "engine") 10, an electric generator 20, a battery 40, a drive motor 50, auxiliary components 60, a gear 71, and drive wheels 72. The vehicle 1 generates electric power by driving the electric generator 20 with the engine 10, and drives the drive motor 50 with the electric power generated by the electric generator 20.

The engine 10 is, for example, a gasoline engine. The engine 10 is connected to the electric generator 20 in a power transmittable manner. The electric generator 20 is a motor generator and can also execute motoring of the engine 10 in addition to electric power generation. The motoring is executed by driving the engine 10 in an operation stopped state by the electric generator 20. The drive motor 50 is a motor generator and generates a driving force of the vehicle 1. The driving force generated by the drive motor 50 is transmitted to the drive wheels 72 via the gear 71 which is a reduction gear. The drive motor 50 is driven by power from the drive wheels 72 to execute energy regeneration. Energy regenerated by the drive motor 50 as electric power can be charged into the battery 40.

The battery 40 stores the electric power generated by the electric generator 20 and the electric power regenerated by the drive motor 50. For example, a lithium ion secondary battery can be used as the battery 40. A discharge request state of charge (SOC) is set in the battery 40. The SOC is a parameter indicating a state of charge of the battery 40, and the discharge request SOC is set in advance as a value for defining a full charge of the battery 40. In other words, the full charge of the battery 40 is defined by the discharge request SOC, and for example, a case where the SOC as a charging rate is 90% is considered to be the full charge.

In the electric power generation control system shown in the present embodiment, the drive wheels 72 and the engine 10 are independent of each other, and the engine 10 is connected only to the electric generator 20. The engine 10 and the electric generator 20 function as an electric power generation unit and constitute an electric power generation system.

The auxiliary components 60 are devices installed in the vehicle 1, and are devices that require electric power. For example, the auxiliary components 60 include lamps such as a headlight, a speaker, a navigation system, an air conditioner, and the like.

The vehicle 1 further includes an engine controller 11, an electric generator controller 21, a vehicle controller 30, a battery controller 41, and a drive motor controller 51. The engine controller 11, the electric generator controller 21, the vehicle controller 30, the battery controller 41, and the drive motor controller 51 are communicably connected to each other, and form a control unit. The vehicle controller 30 is implemented by one or a plurality of microcomputers including a central processing unit (CPU), a read-only memory (ROM), a random access memory (RAM), and an input/output interface (I/O interface). The vehicle controller 30 can also be referred to as a vehicle control module (VCM). In the vehicle controller 30, various controls are executed by the CPU executing programs stored in the ROM or the RAM. The same applies to the engine controller 11, the electric generator controller 21, the battery controller 41, and the drive motor controller 51.

The electric generator controller 21 controls the electric generator 20. The electric generator controller 21 further includes a first inverter that is an inverter for the electric generator 20. The first inverter may have a separate configuration from the electric generator controller 21. The electric generator controller 21 controls the electric generator 20 by controlling the first inverter.

The drive motor controller 51 controls the drive motor 50. The drive motor controller 51 further includes a second inverter that is an inverter for the drive motor 50. The second inverter may have a separate configuration from the drive motor controller 51. The drive motor controller 51 controls the drive motor 50 by controlling the second inverter.

The first inverter is connected to the electric generator 20 and the battery 40. The first inverter converts an alternating current supplied from the electric generator 20 into a direct current and supplies the direct current to the battery 40. Accordingly, the battery 40 is charged with the electric power generated by the electric generator 20. The first inverter further converts a direct current supplied from the battery 40 into an alternating current and supplies the alternating current to the electric generator 20. Accordingly, the electric generator 20 is driven by the electric power of the battery 40. Signals of a current, a voltage, a SOC, and the like are also input to the electric generator controller 21 from the electric generator 20, the drive motor 50, and the battery 40. The same applies to a relation between the second inverter, the drive motor 50, and the battery 40.

The engine controller 11 controls the engine 10. For example, the engine controller 11 controls a throttle valve, a fuel injection valve, an ignition plug, and the like, and adjusts an intake amount, an injection amount, an ignition timing, and the like, so as to execute an engine control. An engine control signal can be further input to the vehicle controller 30 via the engine controller 11.

The vehicle controller 30 integrally controls the engine 10, the electric generator 20, the battery 40, the drive motor 50, and the like. The vehicle controller 30 receives signals from an accelerator position (accelerator opening degree) sensor 91 for detecting an accelerator position APO and a shift position sensor 92 for detecting a shift position (range) selected by an operation of a driver.

[Configuration Example of Engine System]

Figure 2:
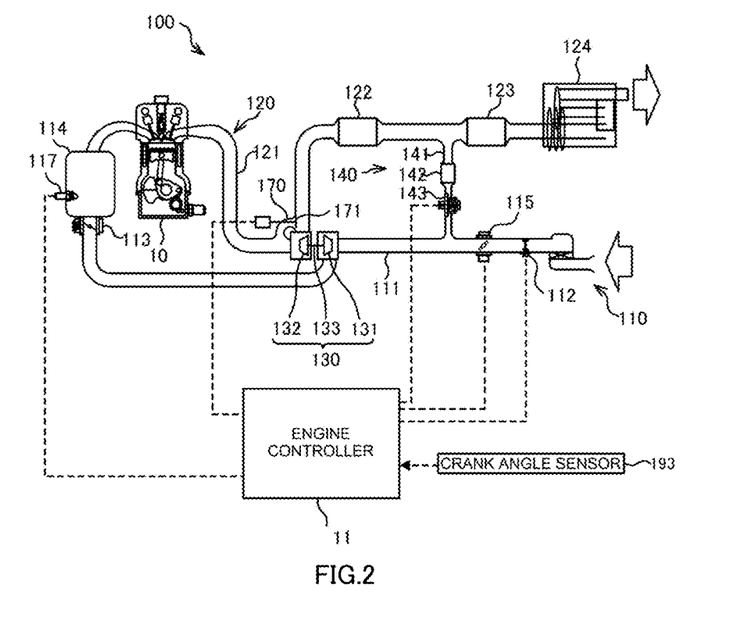
FIG. 2 is a schematic configuration diagram of an engine system.

FIG. 2 is a schematic configuration diagram of an engine system 100 including an engine 10 and an engine controller 11. The engine system 100 includes the engine 10, an intake system 110, an exhaust system 120, a supercharger 130, an exhaust gas recirculation device (hereinafter, also referred to as an EGR device) 140, an exhaust bypass passage 170, a wastegate valve 171, and the engine controller 11.

The intake system 110 includes an intake passage 111, an air flow meter 112, a differential pressure generation valve 115, a throttle valve 113, a collector 114, and a compressor 131. The intake passage 111 allows intake air to flow into the engine 10. In the intake passage 111, the air flow meter 112, the differential pressure generation valve 115, the compressor 131, the throttle valve 113, and the collector 114 are provided in this order from an upstream side. The air flow meter 112 measures a flow rate of the intake air. The differential pressure generation valve 115 is an on-off valve for generating a differential pressure between a portion of the intake passage 111 upstream of the compressor 13 and a portion of the exhaust passage 121 between an upstream catalyst 122 and a downstream catalyst 123. When an opening degree of the differential pressure generation valve 115 is reduced, a pressure of the portion of the intake passage 111 upstream of the compressor 13 is reduced, and the differential pressure described above is developed. The throttle valve 113 adjusts an amount of the intake air introduced into the engine 10. The collector 114 is a volume chamber. The compressor 131 is a compressor of the supercharger 130 and compresses the intake air.

The intake system 110 is further provided with a pressure sensor 117. The pressure sensor 117 is provided in a portion of the intake passage 111 downstream of the throttle valve 113, specifically, in the collector 114.

The exhaust system 120 includes the exhaust passage 121, the upstream catalyst 122, the downstream catalyst 123, a silencer 124, and a turbine 132. The exhaust passage 121 circulates exhaust gas discharged from the engine 10. In the exhaust passage 121, the turbine 132, the upstream catalyst 122, the downstream catalyst 123, and the silencer 124 are provided in this order from the upstream side. The upstream catalyst 122 and the downstream catalyst 123 purify the exhaust gas. The silencer 124 reduces exhaust noise. The turbine 132 is a turbine of the supercharger 130 and recovers energy from the exhaust gas.

The supercharger 130 is a turbocharger, and includes the compressor 131, the turbine 132, and a shaft 133. The compressor 131 is provided in the intake passage 111, and the turbine 132 is provided in the exhaust passage 121. In the supercharger 130, the turbine 132 rotates by energy of the exhaust gas, thereby causing the compressor 131 to rotate via the shaft 133 and compresses intake air. The supercharger 130 compresses the intake air in this manner and supplies the compressed intake air to the engine 10.

The EGR device 140 includes an EGR passage 141, an EGR cooler 142, and an EGR valve 143. The EGR device 140 circulates exhaust gas from a portion of the exhaust passage 121 downstream of the supercharger 130 to a portion of the intake passage 111 upstream of the supercharger 130.

The EGR passage 141 connects the exhaust passage 121 and the intake passage 111. The EGR passage 141 returns a part of the exhaust gas flowing through the exhaust passage 121 to the intake passage 111 as EGR gas. The EGR cooler 142 cools the EGR gas flowing through the EGR passage 141. The EGR valve 143 adjusts a flow rate of the EGR gas flowing through the EGR passage 141.

The EGR device 140, specifically, the EGR passage 141 connects a portion of the exhaust passage 121 downstream of the turbine 132 and a portion of the intake passage 111 upstream of the compressor 131. In this manner, the EGR passage 141 connecting the intake passage 111 and the exhaust passage 121 forms an EGR path of a so-called low pressure loop.

More specifically, the EGR passage 141 connects a portion of the exhaust passage 121 between the upstream catalyst 122 and the downstream catalyst 123 and a portion of the intake passage 111 between the differential pressure generation valve 115 and the compressor 131.

The exhaust bypass passage 170 is provided in the exhaust passage 121. The exhaust bypass passage 170 connects portions of the exhaust passage 121 upstream and downstream of the turbine 132. The exhaust bypass passage 170 circulates the exhaust gas so as to bypass the turbine 132.

The wastegate valve 171 is provided in the exhaust bypass passage 170. The wastegate valve 171 adjusts a flow rate of the exhaust gas flowing through the exhaust bypass passage 170. The wastegate valve 171 adjusts the flow rate of the exhaust gas, thereby adjusting rotation speeds of the turbine 132 and the compressor 131, that is, a rotation speed of the supercharger 130.

The engine controller 11 receives signals from the air flow meter 112, the pressure sensor 117, a crank angle sensor 193, and the like as various sensors and switches.

The crank angle sensor 193 generates a crank angle signal for each predetermined crank angle. The crank angle signal is used as a signal representing the rotation speed of the engine 10.

[Normal Power Generation Control]

In the vehicle 1, the electric power generated by the electric generator 20 is supplied to the battery 40, the drive motor 50, or the auxiliary components 60. The drive motor 50 is driven by electric power generated by the electric generator 20, electric power supplied from the battery 40, or both. For example, in a case where a large driving force is required as in acceleration, the drive motor 50 is driven by the electric power generated by the electric generator 20 and the electric power supplied from the battery 40. In addition, in a case where the battery 40 needs to be charged, part of the electric power generated by the electric generator 20 is supplied to the battery 40. Further, in a case where there is a margin in the SOC of the battery 40, the drive motor 50 may be driven only by the electric power supplied from the battery 40.

Figure 3:
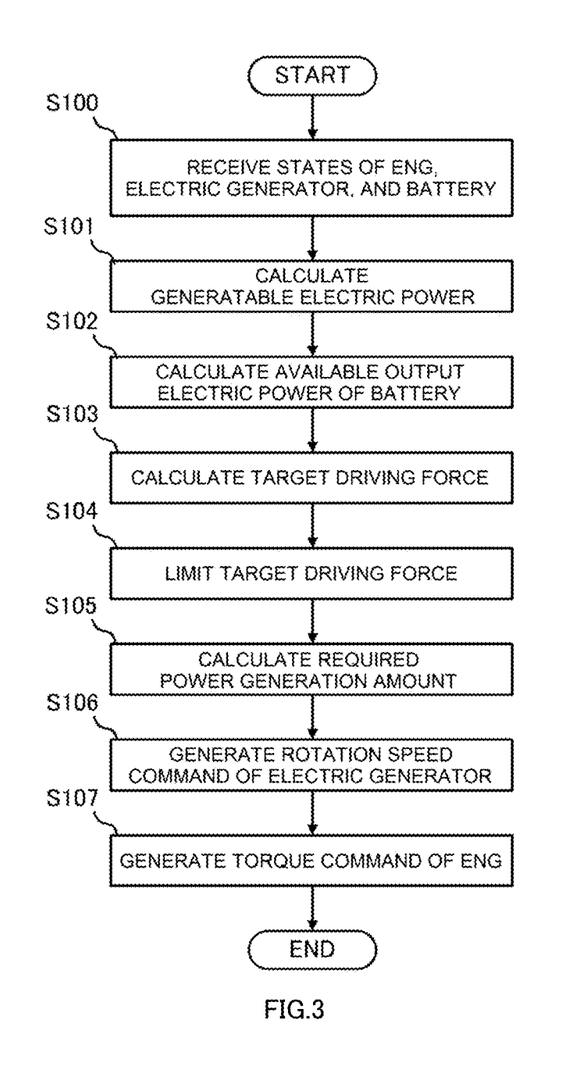
FIG. 3 is a flowchart illustrating a control routine of normal power generation control.

FIG. 3 is a flowchart illustrating a control routine of power generation control executed by the vehicle controller 30 in a case where there is no abnormality in the system of the vehicle 1 including the engine 10, the electric generator 20, and the battery 40 (hereinafter, also referred to as during normal operation). This control routine is programmed in advance in the vehicle controller 30.

In step S100, the vehicle controller 30 receives information on states of the engine 10, the electric generator 20, and the battery 40 from the respective controllers. The "states" here refer to temperatures of the engine 10, the electric generator 20, and the battery 40, the SOC of the battery 40, and the like as a result of failure diagnosis executed in parallel with this routine.

In step S101, the vehicle controller 30 calculates generatable electric power of the electric generator 20 based on specifications of the electric generator 20 and the information received in step S100.

In step S102, the vehicle controller 30 calculates available output electric power of the battery 40 based on a specification of the battery 40 and the information received in step S100.

In step S103, the vehicle controller 30 calculates a target driving force based on a vehicle speed, an accelerator pedal position, and the like.

In step S104, the vehicle controller 30 executes limitation in a case where it is necessary to limit the target driving force based on the generatable electric power and the available output electric power of battery, and sets the limited driving force as the target driving force. For example, in a case where the SOC of the battery 40 is low and a sum of the generatable electric power and the available output electric power of battery is less than electric power required to realize the target driving force, the target driving force is limited to the driving force that can be realized by the sum of the generatable electric power and the available output electric power of battery.

In step S105, the vehicle controller 30 calculates a power generation amount (hereinafter, also referred to as a required power generation amount) required to generate the target driving force set in step S104.

In step S106, the vehicle controller 30 generates a rotation speed command value of the electric generator 20 based on the required power generation amount.

In step S107, the vehicle controller 30 generates a torque command value of the engine 10 based on the rotation speed command value of the electric generator 20.

When a failure occurs in the power generation system, the calculation of the generatable electric power in step S101 is affected. For example, when a defect occurs in a component related to the engine 10, a torque that can be generated by the engine 10 is reduced, and the generatable electric power is also reduced. In this case, the power generation control can be executed by limiting an upper limit torque of the engine 10 to a torque that can be generated in a state where a defect occurs. That is, when information indicating that a failure has occurred is received in step S100, the generatable electric power in a failure state is calculated in step S101, and the processes of step S103 and thereafter can be executed based on the generatable electric power.

However, simply limiting the upper limit torque of the engine 10 may cause a secondary failure.

Here, as an example of the case where a defect occurs in a component related to the engine 10, a case where the differential pressure generation valve 115 is stuck in a state of being not fully opened, that is, a case where the differential pressure generating valve 115 is stuck in a closed state will be described.

The opening degree of the differential pressure generation valve 115 is controlled according to a target value of an amount of exhaust gas recirculated by the EGR device 140 (hereinafter, also referred to as a target EGR amount). The target EGR amount is determined according to an operating state of the engine 10, that is, an engine rotation speed and a torque thereof. Therefore, when the engine 10 is continuously operated in a state where the differential pressure generation valve 115 is stuck in a closed state at an opening degree smaller than an opening degree set based on the operating state of the engine 10, negative pressure is developed in a portion between the differential pressure generation valve 115 and the compressor 131 of the intake passage 111. When the negative pressure is developed, oil may leak from an oil seal (not illustrated) for preventing oil supplied to cool and lubricate the shaft 133 of the supercharger 130 from leaking into the compressor housing. When the oil leaks, cooling and lubrication of the shaft 133 may become insufficient. Further, the leaked oil is supplied to the engine 10 together with the intake air and is subjected to combustion, and thus the leakage of the oil from the oil seal also causes deterioration of emission performance.

On the other hand, when the engine 10 is stopped, a travelable distance depends only on the battery 40, and thus according to a distance to the destination (for example, the repair shop) of the limp-home travelling, the vehicle may be in the power shortage state on the way.

Therefore, in the present embodiment, the torque of the engine 10 is limited such that the negative pressure of the portion of the intake passage 111 between the differential pressure generation valve 115 and the compressor 131 does not exceed a seal limit of the oil seal. In order to gain the travelable distance, the power generation system is controlled such that the power generation efficiency is maximized within the range in which the torque is limited. The power generation control when a failure occurs will be described below.

[Power Generation Control when Failure Occurs]

Figure 4:
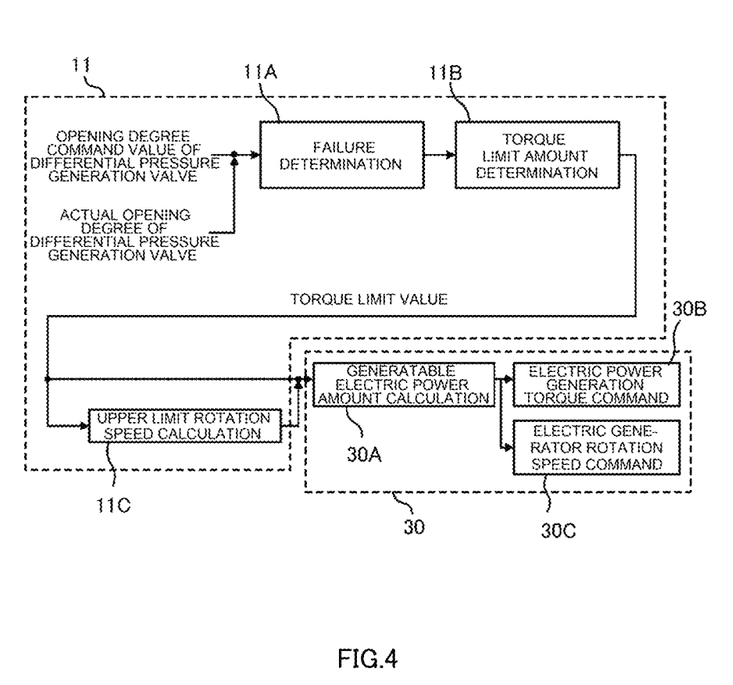
FIG. 4 is a block diagram illustrating contents of power generation control when a failure occurs.

FIG. 4 is a block diagram illustrating contents of the power generation control when a failure occurs.

The engine controller 11 acquires an actual opening degree of the differential pressure generation valve 115, and the failure determination unit 11A compares the actual opening degree with an opening degree command value of the differential pressure generation valve 115 to execute failure determination of the differential pressure generation valve 115. The actual opening degree of the differential pressure generation valve 115 is acquired by reading a detection value of a position sensor (not illustrated) for detecting the opening degree of the differential pressure generation valve 115. The opening degree command value of the differential pressure generation valve 115 is a value set by the engine controller 11 itself, and is read in. In a case where the opening degree command value and the actual opening degree do not coincide with each other, it is determined that a failure has occurred. However, considering detection accuracy of the sensor and the like, it may be considered that the opening degree command value and the actual opening degree coincide with each other as long as a deviation therebetween is within a predetermined range.

A torque limit amount determination unit 11B determines a torque limit amount based on a result of the failure determination. Specifically, when a determination result thereof is that a failure has not occurred, it is determined that torque limitation is not required. When the determination result is that a failure has occurred, a limit value for limiting the torque of the engine 10 is set in accordance with the actual opening degree of the differential pressure generation valve 115. The limit value will be described later.

The determination result of the torque limit amount determination unit 11B is transmitted to an upper limit rotation speed calculation unit 11C of the engine controller 11 and a generatable electric power amount calculation unit 30A of the vehicle controller 30.

In a case where the torque limitation is not required, the upper limit rotation speed calculation unit 11C transmits a design upper limit rotation speed of the engine 10 to the generatable electric power amount calculation unit 30A, and in a case where the limit value is set, the upper limit rotation speed calculation unit 11C calculates the upper limit rotation speed of the engine 10 according to the limit value, and transmits a calculation result to the generatable electric power amount calculation unit 30A. The upper limit rotation speed will be described later.

The vehicle controller 30 calculates a generatable electric power amount based on the limit value of the engine torque and the upper limit rotation speed in the generatable electric power amount calculation unit 30A. Based on the generatable electric power amount, an electric power generation torque command value calculation unit 30B calculates an electric power generation torque command value, and an electric generator rotation speed command value calculation unit 30C calculates a rotation speed command value of the electric generator 20, respectively.

As described above, in the present embodiment, in a case where the differential pressure generation valve 115 is stuck in a closed state, not only the engine torque is limited, but also the upper limit rotation speed of the engine 10 is limited such that the power generation efficiency is maximized within the range in which the torque is limited when required.

Here, the limit value of the engine torque and the upper limit rotation speed will be described.

Figure 5:
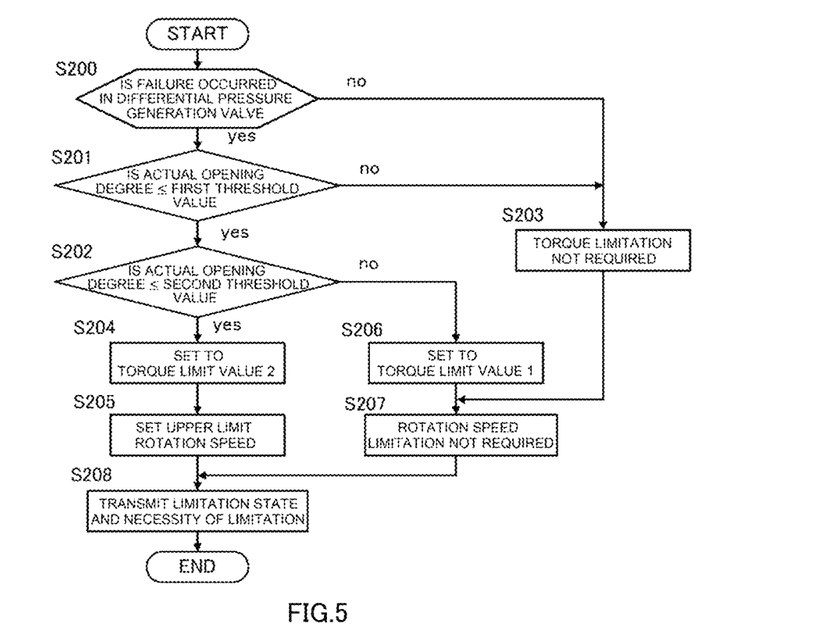
FIG. 5 is a flowchart illustrating a control routine executed by a failure determination unit, a torque limit amount determination unit, and an upper limit rotation speed calculation unit.

FIG. 5 is a flowchart illustrating a control routine executed by the engine controller 11 in the failure determination unit 11A, the torque limit amount determination unit 11B, and the upper limit rotation speed calculation unit 11C illustrated in FIG. 4. The control routine is programmed in advance in the engine controller 11.

In step S200, the failure determination unit 11A determines whether a failure has occurred in the differential pressure generation valve 115 as described above, and in a case where a failure has occurred, the process of step S201 is executed, and in a case where a failure has not occurred, the process of step S203 is executed.

In step S201, the failure determination unit 11A determines whether the actual opening degree is equal to or less than a first threshold value, and in a case where the actual opening degree is equal to or less than the first threshold value, the process of step S202 is executed, and in a case where the actual opening degree is greater than the first threshold value, the process of step S203 is executed. The first threshold value is a value larger than a second threshold value to be described later, and is, for example, an opening degree of about 60% to 70% of in a fully opened state.

In step S202, the failure determination unit 11A determines whether the actual opening degree is equal to or less than the second threshold value, and in a case where the actual opening degree is equal to or less than the second threshold value, the process of step S204 is executed, and in a case where the actual opening degree is greater than the second threshold value, the process of step S206 is executed. The second threshold value is, for example, about 30% to 40% of the opening degree in the fully opened state.

In step S203, the torque limit amount determination unit 11B determines that the torque limitation is not required, and the process proceeds to step S207. The reason why it is determined that the torque limitation is not required is that, when the actual opening degree of the differential pressure generation valve 115 is greater than the first threshold value, the negative pressure in the intake passage 111 is not developed beyond the seal limit of the supercharger 130 even when the torque limitation is not executed. Conversely, the first threshold value is a lower limit value of the opening degree at which the negative pressure of the intake passage 111 does not exceed the seal limit of the supercharger 130 even when the torque limitation is not executed.

When the actual opening degree is equal to or less than the second threshold value, the torque limit amount determination unit 11B sets the limit value for limiting the torque of the engine 10 to a torque limit value 2 in step S204, and the upper limit rotation speed calculation unit 11C sets the upper limit rotation speed of the engine 10 based on the torque limit value 2 in step S205. On the other hand, when the actual opening degree is greater than the second threshold value, the torque limit amount determination unit 11B sets the limit value for limiting the torque of the engine 10 to a torque limit value 1 larger than the torque limit value 2 in step S206, and sets that limitation of the engine rotation speed is not required in step S207. The reason why the limitation of the engine rotation speed is not required is that, when the engine torque is limited by the torque limit value 1, the negative pressure in the intake passage 111 does not exceed the seal limit of the supercharger 130 without limiting the engine rotation speed. Conversely, the second threshold value is a lower limit value of the opening degree at which the torque limitation is not required but the limitation of the engine rotation speed is not required, and the torque limit value 1 is a value at which the negative pressure in the intake passage 111 does not exceed the seal limit of the supercharger 130 regardless of the engine rotation speed even in a state where the differential pressure generation valve 115 is stuck in a closed state.

When the process of step S205 or step S207 is completed, necessity and a limitation state of the limitation determined in the process described above in step S208 are transmitted from the torque limit amount determination unit 11B and the upper limit rotation speed calculation unit 11C to the generatable electric power amount calculation unit 30A.

As described above, in the present embodiment, in a case where the differential pressure generation valve 115 is stuck in a closed state, two threshold values are provided for the actual opening degree in the stuck closed state, and any of no torque limitation, limitation by the torque limit value 1, and limitation by the torque limit value 2 is determined according to a relation with the threshold values. In a case where the engine rotation speed is limited by the torque limit value 2, the upper limit rotation speed thereof is also set.

Figure 6:
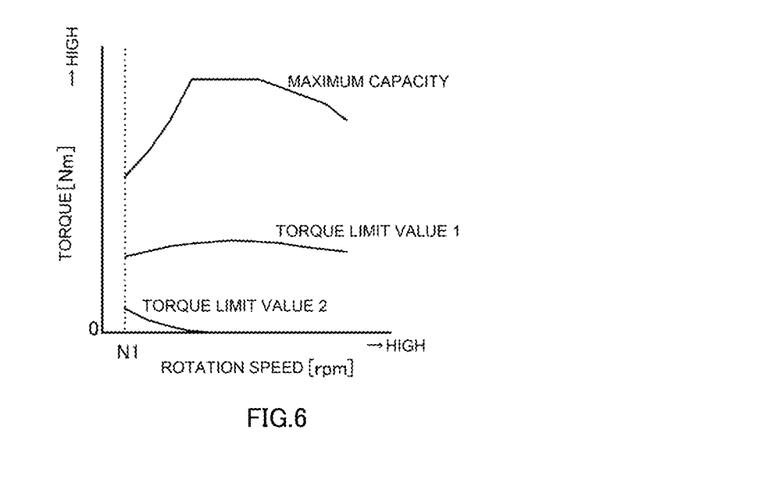
FIG. 6 is an example of a rotation speed-torque characteristic diagram.

Next, the upper limit rotation speed of the engine 10 will be described. FIG. 6 is an example of a rotation speed-torque characteristic diagram illustrating a relation between the rotation speed and the torque of the engine 10. In the drawing, a horizontal axis represents the engine rotation speed, and a vertical axis represents the engine torque.

In the present embodiment, when the engine torque is limited by the torque limit value 2, the reason why the upper limit rotation speed is set to limit the engine rotation speed is to achieve that the negative pressure in the intake passage 111 (more specifically, the negative pressure of the portion between the differential pressure generation valve 115 and the compressor 131) does not exceed the seal limit of the supercharger 130 in a state where the differential pressure generation valve 115 is stuck in a closed state. Since a magnitude of the negative pressure is determined by an amount of air passing through the differential pressure generation valve 115, it is necessary to regulate the amount of air passing through the differential pressure generation valve 115. Therefore, the torque limit value 2 is set to an equivalent air amount line of an upper limit amount of air at which the negative pressure does not exceed the seal limit of the supercharger 130.

In the present embodiment, in a case where the differential pressure generation valve 115 fails, an object thereof is to allow the vehicle to drive itself to a place where the failure is repaired. For this purpose, it is necessary to maintain power generation capacity. Therefore, in a case where power generation is executed in a state where the differential pressure generation valve 115 is stuck in a closed state, the engine torque is limited to protect the engine system 100, and the engine 10 is operated at an operating point at which the power generation efficiency is maximized under the limitation, in other words, at an operating point at which the engine torque is maximized under the limitation. In FIG. 6, the engine torque is reduced as the engine rotation speed increases with the torque limit value 2. Then, the engine 10 is operated at an engine rotation speed N1 having a largest torque. The term "maximized" as used herein is not limited to the maximum in a strict sense, and also includes a range that can be considered as the maximum.

The engine rotation speed N1 is a minimum rotation speed in a case where the engine 10 is operated. However, in a case where a function of limiting the engine rotation speed to an engine rotation speed lower than the engine speed N1 is implemented for another purpose, the engine may be operated at a rotation speed lower than the engine rotation speed N1 by using the function.

Figure 7:
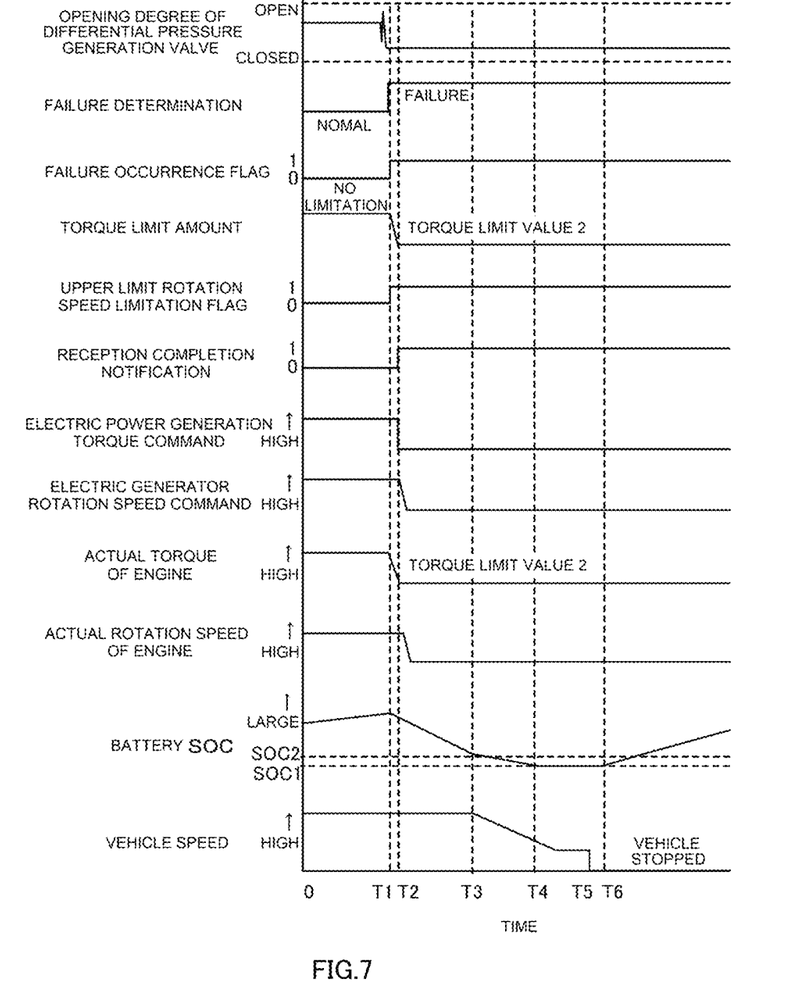
FIG. 7 is a timing chart in a case where a failure occurs in a power generation system.

FIG. 7 is a timing chart in a case where the above-described power generation control is executed in a case where the differential pressure generation valve 115 is stuck in a closed state at an opening degree equal to or less than the second threshold value during traveling while generating electric power.

When the differential pressure generation valve 115 is stuck in a closed state, the engine controller 11 determines that a failure has occurred in the differential pressure generation valve 115 (timing T1). Then, the engine controller 11 sets a failure occurrence flag and an upper limit rotation speed limitation flag, and notifies the vehicle controller 30 of the flags. The engine controller 11 also notifies the vehicle controller 30 of an engine torque limit amount (here, the torque limit value 2). When a limitation is applied to the engine torque, an actual torque of the engine 10 is reduced (timing T1).

Upon receiving a notification transmitted from the engine controller 11, the vehicle controller 30 transmits a reception completion notification to the engine controller 11, and sets the electric power generation torque command value and the electric generator rotation speed command value as described with reference to FIG. 4 (timing T2).

When the engine torque is reduced to the torque limit value 2, the engine controller 11 decreases the engine rotation speed to the upper limit rotation speed.

The battery SOC starts to decrease as the engine torque is reduced (timing T1). This is because the reduction in the engine torque prevents the electric generator 20 from generating electric power necessary to maintain the vehicle speed, and the electric power of the battery 40 is used to compensate for the shortage of electric power. Supplying the electric power of the battery 40 as the electric power for driving in this manner is also referred to as "electric power assist".

The vehicle speed is maintained by executing the electric power assist, but when the battery SOC is reduced to SOC2 at a timing T3, the electric power supplied from the battery 40 by the electric power assist is limited. Accordingly, the vehicle speed starts to decrease. When the battery SOC is reduced to SOC1 at a timing T4, the electric power assist is stopped. The reason why the electric power assist is limited and stopped as described above is to prioritize suppression of a reduction in the SOC of the battery 40 over maintenance of the vehicle speed. The SOC1 at which the electric power assist is stopped is, for example, 40%. The SOC2 that limits the electric power assist is, for example, 50%. The electric power assist may be stopped when the SOC of the battery 40 is reduced to the SOC1 without limiting the electric power assist during the SOC is reduced from the SOC2 to the SOC1. By changing a method of supplying electric power to the drive motor 50 in accordance with the SOC of the battery 40 in this manner, the SOC of the battery 40 can be prevented from falling below the SOC1.

The power generation control at the time of failure in the present embodiment is continued even after the vehicle stops at a timing T5. Since electric power for driving is no longer required when the vehicle is stopped, the battery 40 can be charged with the electric power generated by the electric generator 20. As a result, the SOC is increased, and after a timing T6, the SOC recovers to a level at which the electric power assist can be executed. By continuing the electric power generation even while the vehicle is stopped in this manner, the power shortage state can be suppressed.

In the present embodiment, the case where the differential pressure generation valve 115 is stuck in a closed state has been described, but the failure of the power generation system is not limited thereto. For example, failures of the power generation system include defects of some of a plurality of fuel injectors in a multi-cylinder engine 10 and defects of a fuel pump that supplies fuel to the fuel injectors. When defects of the fuel systems occur, a desired fuel injection amount cannot be obtained, and thus the engine torque is limited according to a fuel injection amount that can be injected, and the engine rotation speed at which the power generation efficiency of the electric generator 20 is maximized is set within the limited engine torque range.

As described above, the present embodiment provides a hybrid vehicle control method for controlling a series hybrid vehicle 1 including a power generation system that generates electric power by driving the electric generator 20 with the engine 10. In the method, in a case where a failure occurs in the power generation system, the control units 11 and 30 limit the torque of the engine 10, set an engine rotation speed at which the power generation efficiency of the electric generator 20 is maximized within a range in which the torque is limited, and control the engine 10 based on the engine rotation speed. As described above, instead of completely stopping the power generation system due to the failure of the power generation system, the upper limit rotation speed of the engine 10 is set to generate electric power, so that a reduction in the SOC of the battery 40 is suppressed and the power shortage state is avoided. By avoiding the power shortage state, it is possible to continue travelling even in a state where the power generation system fails.

In the present embodiment, before the SOC (state of charge) of the battery 40 falls below the SOC1 (threshold value), the control units 11 and 30 supply the electric power of the battery 40 and the generated electric power of the electric generator 20 to the drive motor 50 for travelling, and when the SOC falls below the SOC1, the control units 11 and 30 stop the supply of electric power from the battery 40 and supply only the generated electric power to the drive motor 50 for travelling. Accordingly, a situation in which the SOC is further reduced beyond the SOC1 can be avoided, and as a result, a situation of a power shortage state can be avoided.

In the present embodiment, the controllers 11 and 30 execute the electric power generation that is based on the engine 10 and charge the battery 40 with the generated electric power when the SOC falls below the SOC1 and the vehicle is stopped. As a result, the SOC can be increased even in a state where the power generation system fails.

In the present embodiment, the controllers 11 and 30 restart the supply of electric power from the battery 40 to the drive motor 50 during traveling in a case where the SOC recovers to the SOC1 or more. Accordingly, it is possible to suppress a reduction in travelling performance due to a failure of the power generation system.

The case where a failure occurs in the power generation system according to the present embodiment is a case where a defect occurs in a component related to the engine 10. Therefore, a secondary failure of the engine 10 can be avoided by limiting the engine torque and the engine rotation speed as in the present embodiment.

The case where a defect occurs in a component related to the engine 10 according to the present embodiment is, for example, a case where the differential pressure generation valve 115 provided in the intake passage 111 of the engine 10 is stuck in a closed state. When the operation is continued without limiting the engine torque and the engine rotation speed in a state where the differential pressure generation valve 115 is stuck in a closed state, the negative pressure in the intake passage 111 may be developed and oil may leak from the oil seal of the supercharger 130, but this can be avoided according to the present embodiment.

Although the embodiment of the present invention has been described above, the above embodiment is merely a part of application examples of the present invention, and does not mean that the technical scope of the present invention is limited to the specific configurations of the above embodiment.

The invention claimed is:

1. A series hybrid vehicle control method for controlling a series hybrid vehicle including a power generation system that generates electric power by driving an electric generator with an internal combustion engine including a supercharger, the method comprising:
    in a case where a failure in which a differential pressure generation valve provided in an intake passage of the internal combustion engine is stuck in a closed state occurs,
    limiting a torque of the internal combustion engine to a range in which a negative pressure in a portion of the intake passage which is between the differential pressure generation valve and a compressor of the supercharger does not exceed a seal limit of an oil seal of the supercharger even in a state where the differential pressure generation valve is stuck in a closed state;
    setting an engine rotation speed at which power generation efficiency of the electric generator is maximized within the range in which the torque is limited; and
    controlling the internal combustion engine based on the engine rotation speed.

2. The series hybrid vehicle control method according to claim 1, further comprising:
    supplying, until a state of charge of a battery falls below a threshold value, electric power of the battery and generated electric power of the electric generator to a drive motor for travelling; and
    stopping, when the state of charge falls below the threshold value, supply of the electric power from the battery, and supply only the generated electric power to the drive motor for travelling.

3. The series hybrid vehicle control method according to claim 2, further comprising:
    when the state of charge falls below the threshold value and the vehicle is stopped, executing electric power generation that is based on the internal combustion engine and charge the battery with the generated electric power.

4. The series hybrid vehicle control method according to claim 3, further comprising:

restarting supply of the electric power from the battery to the drive motor during traveling in a case where the state of charge is restored to the threshold value or more.

5. A series hybrid vehicle comprising:
a power generation system configured to generate electric power by driving an electric generator with an internal combustion engine including a supercharger; and
a control unit configured to control the power generation system, wherein the control unit is programmed to:
  in a case where a failure in which a differential pressure generation valve provided in an intake passage of the internal combustion engine is stuck in a closed state occurs,
  limit a torque of the internal combustion engine to a range in which a negative pressure in a portion of the intake passage which is between the differential pressure generation valve and a compressor of the supercharger does not exceed a seal limit of an oil seal of the supercharger even in a state where the differential pressure generation valve is stuck in a closed state;
  set an engine rotation speed at which power generation efficiency of the electric generator is maximized within the range in which the torque is limited; and
  control the internal combustion engine based on the engine rotation speed.

* * * * *